United States Patent
Hofmann et al.

(10) Patent No.: US 6,705,589 B2
(45) Date of Patent: Mar. 16, 2004

(54) ELECTROMAGNETICALLY ACTUATED VALVE, ESPECIALLY FOR HYDRAULIC BRAKING SYSTEMS IN MOTOR VEHICLES

(75) Inventors: Dirk Hofmann, Ludwigsburg (DE); Hans-Friedrich Schwarz, Muehlacker (DE); Gerhard Hahl, Korntal-Muenchingen (DE); Valentin Schubitschew, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 10/110,654

(22) PCT Filed: Aug. 3, 2001

(86) PCT No.: PCT/DE01/02964
§ 371 (c)(1),
(2), (4) Date: Jul. 8, 2002

(87) PCT Pub. No.: WO02/16180
PCT Pub. Date: Feb. 28, 2002

(65) Prior Publication Data
US 2002/0179874 A1 Dec. 5, 2002

(30) Foreign Application Priority Data
Aug. 19, 2000 (DE) .......................................... 100 40 763

(51) Int. Cl.⁷ .............................. B60T 8/36; F16K 31/06
(52) U.S. Cl. .............................. 251/129.15; 251/129.08; 251/333; 303/119.2
(58) Field of Search ........................ 251/129.15, 129.08, 251/333; 303/119.2

(56) References Cited

U.S. PATENT DOCUMENTS

| | | | | | |
|---|---|---|---|---|---|
| 5,203,617 A | * | 4/1993 | Wilde | .................. | 303/119.2 X |
| 5,538,336 A | * | 7/1996 | Reuter et al. | ............ | 303/119.2 |
| 5,669,675 A | * | 9/1997 | Mueller et al. | .......... | 303/119.2 |
| 5,803,556 A | * | 9/1998 | Weis et al. | ............... | 303/119.2 |
| 5,865,213 A | * | 2/1999 | Scheffel et al. | ..... | 251/129.15 X |
| 5,879,060 A | * | 3/1999 | Megerle et al. | .......... | 303/119.2 |
| 6,092,781 A | * | 7/2000 | Hohl et al. | ............ | 303/119.2 X |
| 6,113,066 A | * | 9/2000 | Hohl et al. | .......... | 251/129.15 X |
| 6,152,420 A | * | 11/2000 | Hohl | .................... | 303/119.2 X |
| 6,231,029 B1 | * | 5/2001 | Park | ...................... | 251/129.15 |
| 6,238,014 B1 | * | 5/2001 | Tamai et al. | ............. | 303/119.2 |
| 6,322,049 B1 | * | 11/2001 | Hofmann et al. | ...... | 251/129.15 |

FOREIGN PATENT DOCUMENTS

| | | |
|---|---|---|
| DE | 41 34 490 A1 | 4/1993 |
| DE | 196 04 317 A1 | 8/1997 |
| DE | 198 02 464 A | 7/1999 |
| DE | 198 36 494 A | 10/1999 |
| EP | 0 670 445 A | 9/1995 |
| WO | 97 28999 A | 8/1997 |

* cited by examiner

*Primary Examiner*—Paul J. Hirsch
*Assistant Examiner*—Eric Keasel
(74) *Attorney, Agent, or Firm*—Michael J. Striker

(57) ABSTRACT

The valve (10) has a seat valve (27) comprising a hollow cone-shaped valve seat (24) and an hemispherical shutoff element (26). An afflux bore (23) having contact with a pressure-medium inlet (19) discharges centrically into the valve seat (24). A solenoid armature (30) acting upon the seat valve (27) in opening fashion grips a push rod (25) comprising the shutoff element (26). The solenoid armature cooperates with a pole body (42) according to the flat-type armature principle. A preloaded return spring (39) acting on the seat valve (27) in closing fashion is arranged between the pole body (42) and the solenoid armature (30). The valve (10) works as a proportioning valve, because, in addition to a suitable design of the seat valve (27) and push rod (25), the magnetic force is infinitely variable and, together with a hydraulic force, has a monotonously increasing course as the valve opening stroke increases, while the spring force—which also has a monotonously increasing course as the valve opening stroke increases—has a positive slope that is greater than that of the course of the magnetic and hydraulic force.

2 Claims, 2 Drawing Sheets

ELECTROMAGNETICALLY ACTUATED VALVE, ESPECIALLY FOR HYDRAULIC BRAKING SYSTEMS IN MOTOR VEHICLES

RELATED ART

The invention is based on an electromagnetically actuated valve according to the general class in claim 1.

A valve is already known (DE 41 34 490 A1) that is designed as a proportioning pressure-control valve. To obtain good control behavior, the known pressure-control valve equipped with a seat valve closed without current is designed according to the solenoid plunger principle, that is, the pole body has a recess on the front side into which the basically cylindrical solenoid armature plunges more or less deeply as a function of an electric current supplied to an electrical winding enclosing the pole body. The magnetic force acting upon the solenoid armature is thereby supported by a hydraulic force in the sense of opening the seat valve, while the force of the return spring counteracts these forces.

The known valve has the disadvantage, however, that the solenoid plunger principle requires increased expenditures in the structural design of the pole body and solenoid armature. In particular, low radial tolerances are required between the solenoid armature and the pole body to prevent the formation of secondary air gaps. This, in turn, requires a costly guidance of the solenoid armature with low guidance play, because transversal forces on the solenoid armature can lead to functional failings. The known valve is therefore costly to manufacture.

Moreover, an electromagnetically actuated valve operating according to the flat-type armature principle is made known in DE 196 04 317 A1 that comprises a seat valve that is open in the non-energized state. Although this known valve is designed like a two-position valve (open, close valve), it can be moved into numerous random intermediate positions using short strokes like a proportioning valve by controlling the magnetic force that counteracts the force of a return spring and a hydraulic force, without having to comprise the expensive design of a proportioning valve, however. The main contributing features here are the design of the seat valve and the coordination of the magnetic force characteristic curve and return spring.

ADVANTAGES OF THE INVENTION

In contrast to the proportioning valve mentioned initially, the electromagnetically actuated valve according to the invention having the features in claim 1 has the advantage that it has the simple design of a two-position valve with a flat-type armature but behaves like a proportioning valve. Since, with the flat-type armature, the lines of flux of the magnetic circuit in the working air gap basically extend between the facing-each-other, flat front sides of pole body and solenoid armature, radial tolerances have little effect in this design. Moreover, the design of the seat valve and push-rod region contributes to a stable control behavior of the valve according to the invention working as pressure-control valve: the pressure prevailing on the side of the pressure-medium inlet supports the magnetic force to open the seat valve. Pressure medium emerging from the valve seat is directed without turbulence along the shutoff member and the push rod against the solenoid armature and exerts an opening effect. As the pressure differential between pressure-medium inlet and pressure-medium outlet decreases, this force effect diminishes, and the valve reaches a stable final position of the seat valve when the pressure at the outlet adjusted as a function of flow is reached. This control procedure takes place with dynamics and control quality that suffices for many applications.

An advantageous design of the valve according to the invention is described in claim 2.

BRIEF DESCRIPTION OF THE DRAWING

A simplified version of an exemplary embodiment of the invention is shown in the drawing and described in greater detail in the subsequent description.

DETAILED DESCRIPTION OF THE EXEMPLARY EMBODIMENT

Figure 1:
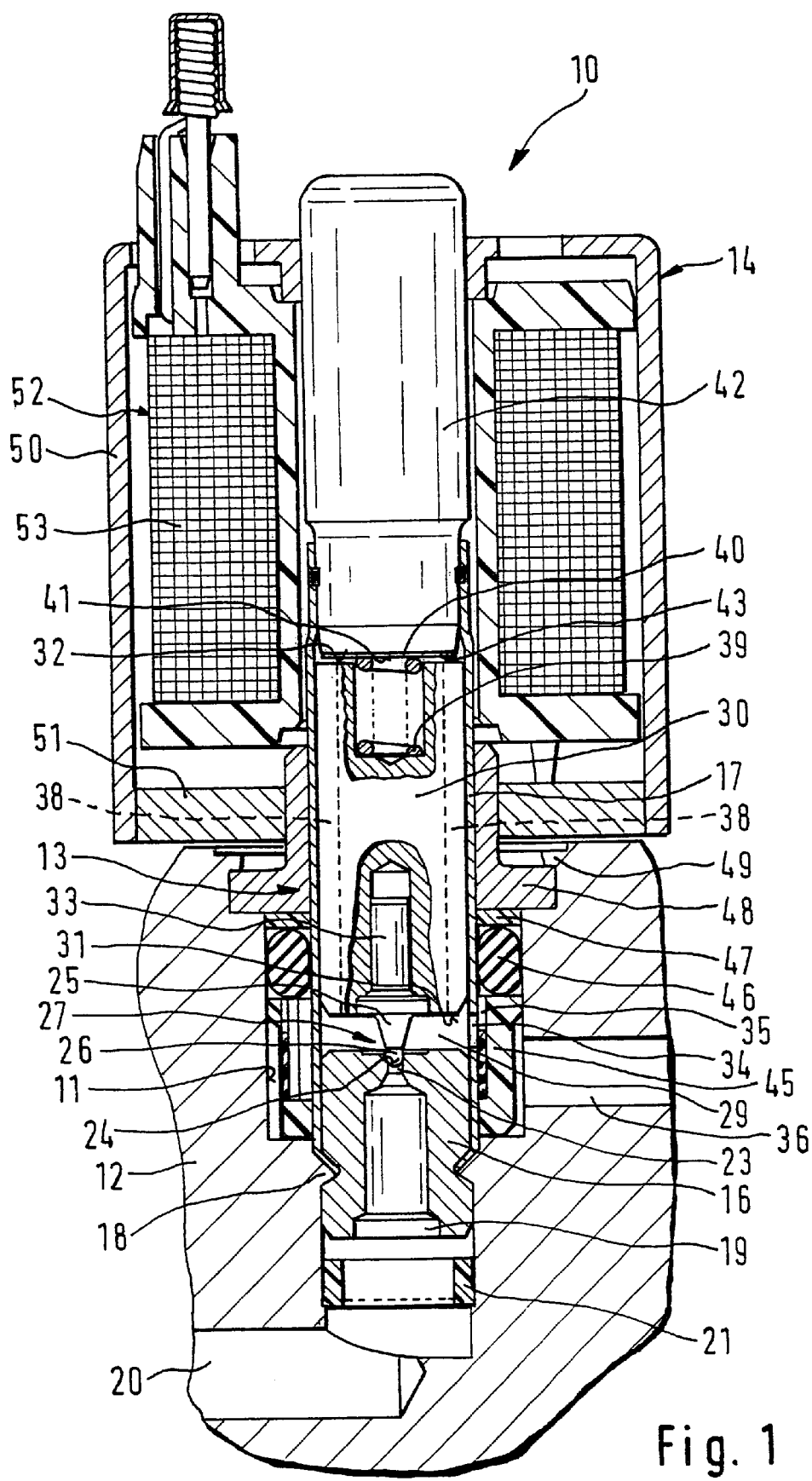
FIG. 1 shows a longitudinal view of an electromagnetically actuated valve having a seat valve. In contrast to FIG. 1.

An electromagnetically actuated valve 10 shown in the drawing in FIG. 1 for hydraulic brake systems in motor vehicles, e.g., power-brake systems according to DE 195 46 647 A1, basically comprises two assemblies: a hydraulic portion 13 secured in a stepped bore 11 of a valve block 12, and an electrical portion 14 fitted onto the hydraulic portion.

The hydraulic portion 13 of the valve 10 has a longitudinally penetrating valve body 16 that is connected to an armature guide sleeve 17. The valve body 16 and the armature guide sleeve 17 are secured in the stepped bore 11 of the valve block 12 by means of a first caulked joint 18. The valve body 16 comprises a pressure-medium inlet 19 of the valve 10 that is connected to an afflux passage 20 for discharging pressure medium at the base of the stepped bore 11. A filter disc 21 is situated in the stepped bore 11 between the pressure-medium inlet 19 and the afflux passage 20.

The valve body 16 is provided with an afflux bore 23 in the region opposite to the base of the bore, which said afflux bore transitions into a hollow cone-shaped valve seat 24. An hemispherical shutoff element 25 formed on a push rod 25 is coordinated with the valve seat 24. The valve seat 24 and the shutoff element 26 form a seat valve 27 that is described in greater detail further below using FIG. 2.

In the armature guide sleeve 17, a valve chamber 29 abuts the valve body 16, in which said valve chamber a solenoid armature 30 is longitudinally moveably guided. The solenoid armature 30 basically has the design of a straight circular cylinder with radially extending front sides 31 and 32. The push rod 25 rises from the front side 31 facing the valve body 16, which said push rod is pressed into the solenoid armature 30 with a pin 33. The portion of the valve chamber 29 situated between the valve body 16 and the solenoid armature 30 is connected to a pressure-medium outlet 35 of the valve 10 by means of an opening 34 in the armature guide sleeve 17 and further to a forward-flow passage 36 of the valve block 12 discharging into the stepped bore 11. Apart from the push rod 25, the portion of the valve chamber 29 situated between the valve body 16 and the solenoid armature 30 contains no installed parts.

The solenoid armature 30 has relatively great radial play in relation to the armature guide sleeve 17. Said solenoid armature is provided with two longitudinal grooves 38 extending along its entire length. A return spring 39 in the form of a helical compression spring is accommodated in the solenoid armature 30 in the region of its front side 32 opposite to the valve body 16. This said return spring has relatively great stiffness and grips a residual air gap disc 40 with preload, which said residual air gap disc is supported on a radially extending front side 41 of a pole body 42. The pole body 42 engages with part of its length in the armature guide sleeve 17, to which it is connected in pressure-medium-tight fashion. A working air gap 43 which determines the opening stroke of the valve 10 is located between the front side 32 of the solenoid armature 30 and the residual air gap disc 40.

A filter sleeve 45 situated between the pressure-medium outlet 35 and the forward-flow passage 36 is accommodated in the stepped bore 11 of the valve block 12 on the jacket side of the armature guide sleeve 17. In the direction toward the outlet of the stepped bore 11, this said filter sleeve is followed by a sealing ring 46, a disc 47 and a bushing 48 that is secured by means of a second caulked joint 49 in the stepped bore 11 of the valve block 12.

The electrical portion 14 fitted onto the hydraulic portion 13 of the valve has a coil 52 with an electrical winding 53 enclosed in a housing 50 with a washer 51. While the housing 50 radially inwardly abuts the pole body 42, the washer 51 establishes a connection with the bushing 48.

The solenoid armature 30, the pole body 42, the bushing 48, the housing 50, and the washer 51 are composed of magnetically conductive material, while the armature guide sleeve 17 and the residual air gap disc 40 are not magnetically conductive. A magnetic circuit produced when current is supplied to the electrical winding 53 extends over the pole body 42, the residual air gap disc 40, the solenoid armature 30, the armature guide sleeve 17, the washer 51, and the housing 50 of the electrical portion 14. The solenoid armature 30 and the pole body thereby cooperate according to the flat-type armature principle.

Figure 2:
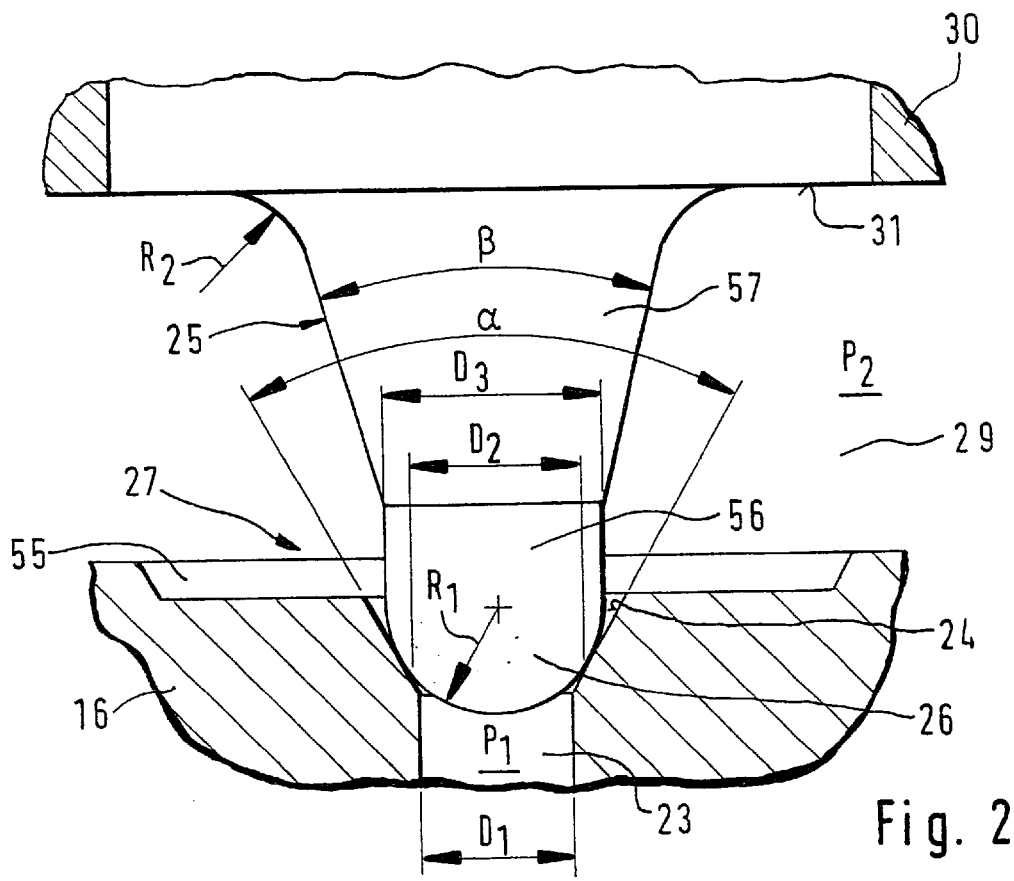
FIG. 2 shows an enlarged view of the seat valve situated in the closed position in the non-energized state.

The region of the seat valve 27 that is important to the function of the valve 10 as a pressure-control valve comprises the following design features, which are described using FIG. 2:

The hollow cone-shaped valve seat 27 has a cone angle α, which does not exceed 75°. The valve seat 24 is delimited with sharp edges from the valve chamber 29 by means of a flat recess 55 in the valve body 16. The radius $R_1$ of the hemispherical shutoff element 26 is coordinated with the valve seat 24 in such a fashion that the diameter $D_1$ of the afflux bore 23 nearly corresponds to the seal diameter $D_2$ of the seat valve 27. A relatively short cylindrical portion 56 of the push rod 25 follows the shutoff element 26. The cylindrical portion 56 has a diameter $D_3$ that corresponds to twice the radius $R_1$ of the shutoff element 26. A cone-shaped portion 57 of the push rod 25 against the solenoid armature 30 steplessly abuts the cylindrical portion 56. This said cone-shaped portion has a cone angle β of approximately 35° and steplessly transitions with rounded transition having the radius $R_2$ into the front side 31 of the solenoid armature 30.

A pressure $P_1$ prevails in the afflux bore 23, which said pressure is provided by a high-pressure pump or a pressure-medium accumulator if the valve 10 is used in the initially-mentioned power-brake system. A pressure $P_2$ of between the value 0 and $P_1$ can prevail in the valve chamber 29.

The electromagnetically actuated valve 10 operates as follows:

The starting point is a non-energized state of the electrical winding 53, so that the seat valve 27 assumes its closed position (as shown in FIGS. 1 and 2). A relatively high pressure $P_1$ prevails on the afflux side of the seat valve 27, and a very low pressure $P_2$ prevails on the forward-flow side.

Figure 3:
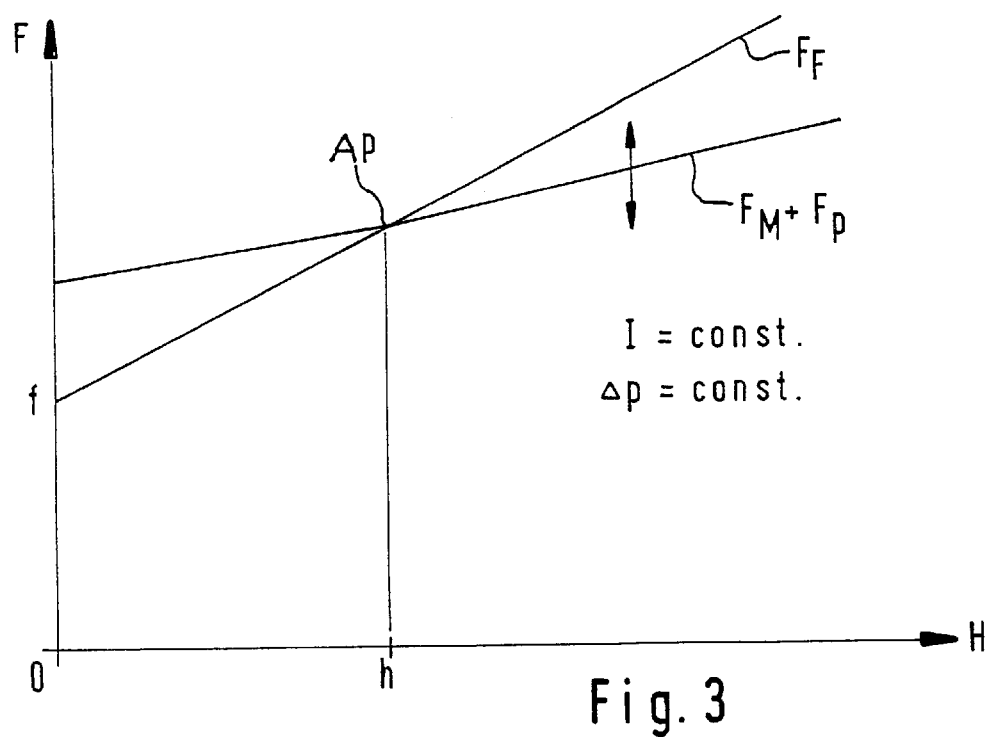
FIG. 3 shows a diagram of the forces acting in the valve along the valve opening stroke.

The preloaded return spring 39 exerts a force f on the solenoid armature 30 and the push rod 25 that holds the seat valve 27 in the closed position up to a permissible maximum value of the pressure $P_1$. In the diagram shown in FIG. 3—which shows the course of the forces F acting in the valve 10 along the valve opening stroke, namely spring force $F_F$, magnetic force $F_M$, and hydraulic force $F_P$—this preload force f of the spring 39 is plotted on the ordinate at 0 travel. In the diagram, the course of the spring force $F_F$ exerted by the return spring 39 is shown as a straight line, the course of which increases monotonously as the valve opening stroke H increases. The high stiffness of the return spring 39 determines the relatively high slope of the spring force characteristic curve. The second characteristic curve represents the course of the magnetic force $F_M$ and hydraulic force $F_P$—which are combined in cumulative fashion—at a constant current I and a constant pressure differential $\delta_P$ between the pressures $p_1$ and $p_2$. The characteristic curve $F_M+M_P$ has a course that increases monotonously as the valve opening stroke H increases, the slope of which said course is less than that of the characteristic curve $F_F$, however. This relatively flat course of the characteristic curve $F_M+F_P$ is basically achieved by the layout of the magnetic circuit and, in fact, by means of a relatively great working air gap 43 and a relatively thick residual air gap 40. Additionally, the effect of the hydraulic force $F_P$ on the push rod 25 and solenoid armature 30 is kept to a minimum by the fact that the seal diameter $D_2$ is relatively small, and by the fact that pressure medium flows around all sides of the solenoid armature 30. The working point AP of the valve 10 is located at the intersection of the two characteristic curves, at which said working point the seat valve 27 assumes a working stroke h. By changing the current I applied to the electrical winding 53 of the coil 52, the characteristic curve $F_M+F_P$ is capable of being shifted in the diagram and, accordingly, the working point AP is capable of being adjusted to a different stroke h.

When current is applied to the electrical winding 53 of the coil 52, the magnetic force $F_M$ acts upon the solenoid armature 30 in an opening fashion. The hydraulic force $F_P$ represented by the pressure differential $p_1-p_2$ also has an opening effect on the push rod 25. The force $F_F$ of the return spring 30 acting, in contrast, in a closing fashion is overcome when the current I is sufficiently high and opens the seat valve 27. Pressure medium flows from the pressure-medium inlet 19 to the pressure-medium outlet 35 of the valve 10. In this process, pressure medium flows along the push rod 25 toward the front side 31 of the push rod and solenoid armature 30 and exerts an opening effect on these. As the pressure $p_2$ in the valve chamber 29 increases, a pressure imbalance occurs at the solenoid armature 30 that reduces the hydraulic force $F_P$ acting in opening fashion. The spring force $F_F$ exerted by the return spring 30 moves the seat valve 27 into the closed position when the forward-flow side pressure $p_2$ coordinated with the electric current I is reached. Due to the design of the valve 10, the forward-flow side pressure $p_2$ is proportional to the current I applied to the electrical winding 53.

The electromagnetically actuated valve 10 is self-stabilizing when minor disruptions occur:

The working point AP of the valve 10 is assumed when an equilibrium of forces between the magnetic force $F_M$, the hydraulic force F, and the spring force $F_F$ is given. Disruptions in this equilibrium of forces, caused by fluctuations in hydraulic force $F_P$, for instance, only lead to a short-term shifting of the working point AP: an increase in the hydraulic force $F_P$ therefore leads to an extension of the valve opening stroke H, with the consequence that the spring force $F_F$ increases at the same time. Although this initially results in a shifting of the working point AP on the spring force characteristic curve $F_F$, it is offset by the return of the solenoid armature 30 by means of the spring force $F_F$ on the working stroke h after the hydraulic disruption is eliminated, however.

In the non-energized state, the valve 10 is also capable of being used as a pressure-relief valve:

If pressures $p_1$ prevail at the pressure medium inlet 19 that produce an hydraulic force $F_p$ acting in opening fashion that is less than the preload force f of the return spring 39, the seat valve 27 remains in its closed position. If, on the other hand, the preload force f of the return spring 39 is overcome at higher pressures, the seat valve 27 opens, and pressure medium can flow forward from the pressure-medium inlet 19 of the valve 10 to its pressure-medium outlet 35 with a pressure-relieving effect.

What is claimed is:

1. An electromagnetically actuated valve (10), for hydraulic brake systems in motor vehicles, having the following features:
    a seat valve (27) closed without current is arranged between a pressure-medium inlet (19) and a pressure-medium outlet (35),
    the seat valve (27) has a hollow cone-shaped valve seat (24) and an hemispherical shutoff element (26) formed on a push rod (25),
    an afflux bore (23) having contact with the pressure-medium inlet (19) discharges centrically into the valve seat (24),
    a solenoid armature (30) acting upon the seat valve (27) in opening fashion grips the push rod (25), with which said solenoid armature a pole body (42) corresponds on the side opposite to the push rod,
    a preloaded return spring (39) acting on the seat valve (27) in closing fashion is supported at the solenoid armature (30), characterized by the further features:
    the diameter ($D_1$) of the afflux bore (23) nearly corresponds to the seal diameter ($D_2$) of the seat valve (27),
    the cone angle ($\alpha$) of the valve seat (24) does not exceed 75°,
    pressure medium emerging from the valve seat (24) is capable of being conducted steplessly along the push rod (25) to a radially extending, largely flat front side (31) of the solenoid armature (30) with rounded transition between push rod (25) and solenoid armature (30),
    the solenoid armature (30) and the pole body (42) cooperate according to the flat-type armature principle,
    the magnetic circuit of the valve (10) is designed such that the magnetic force ($F_M$) exerted on the solenoid armature (30) and transmitted to the shutoff element (26) is infinitely variable, whereby its course increases monotonously as the valve opening stroke (H) increases together with a hydraulic force ($F_p$) produced by the pressure medium and acting upon shutoff element (26) and solenoid armature (30),
    the force ($F_F$) produced by the return spring (39) on the shutoff element (26) is set such that it has a course that increases monotonously as the valve opening stroke (H) increases, the positive slope of which is greater than that of the course of the magnetic and hydraulic force.

2. The valve according to claim 1, wherein the hemispherical shutoff element (26) is integrally molded in stepless fashion on a cylindrical portion (56) of the push rod (25), which said cylindrical portion is followed in stepless fashion on the side opposite to the valve seat by a cone-shaped portion (57) of the push rod (25) having low conicity, against which said cone-shaped portion a radially extending front side (31) of the push rod (25) and/or of the solenoid armature (30) abuts after a transition radius ($R_2$).

* * * * *